(12) United States Patent
Fujiwara et al.

(10) Patent No.: US 8,403,090 B2
(45) Date of Patent: Mar. 26, 2013

(54) POWER SUPPLY APPARATUS FOR VEHICLE

(75) Inventors: Hidetomo Fujiwara, Wako (JP); Atsushi Sakurai, Wako (JP); Kazuhisa In, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/445,918

(22) Filed: Apr. 13, 2012

(65) Prior Publication Data

US 2012/0312614 A1    Dec. 13, 2012

(30) Foreign Application Priority Data

Jun. 8, 2011    (JP) ................................. 2011-128049

(51) Int. Cl.
*B60K 1/04* (2006.01)
(52) U.S. Cl. ........................................ 180/68.5; 429/96
(58) Field of Classification Search .................. 180/65.1, 180/68.5, 65.22, 69.1; 429/96, 100; 280/834
See application file for complete search history.

(56) References Cited

U.S. PATENT DOCUMENTS 6,569,556 B2 *   5/2003   Zhou et al. ..................... 429/88

FOREIGN PATENT DOCUMENTS

JP        2009-301877         12/2009

* cited by examiner

*Primary Examiner* — John Walters
*Assistant Examiner* — James Triggs
(74) *Attorney, Agent, or Firm* — Ditthavong Mori & Steiner, P.C.

(57) ABSTRACT

A power supply apparatus includes a plurality of battery modules, a support plate, a plurality of first reinforcing projections, and a plurality of second reinforcing projections. The support plate supports the battery modules and includes a first plate and a second plate. The first plate thermally contacts bottom surfaces of the battery modules. The second plate is placed on a bottom surface of the first plate to define cooling spaces between the first and second plates. A coolant is to flow in the cooling spaces. The plurality of first reinforcing projections is provided on at least one of the first and second plates. The first reinforcing projections project into the cooling spaces and extend in a first direction. The plurality of second reinforcing projections is provided on a top surface of the first plate and extending in a second direction intersecting with the first direction.

19 Claims, 12 Drawing Sheets

POWER SUPPLY APPARATUS FOR VEHICLE

CROSS-REFERENCE TO RELATED APPLICATIONS

The present application claims priority under 35 U.S.C. §119 to Japanese Patent Application No. 2011-128049, filed Jun. 8, 2011, entitled "Power Supply Apparatus for Vehicle." The contents of this application are incorporated herein by reference in their entirety.

BACKGROUND OF THE INVENTION

1. Field of the Invention

The present invention relates to a power supply apparatus for a vehicle.

2. Discussion of the Background

As disclosed in Japanese Unexamined Patent Application Publication No. 2009-301877, there is a power supply apparatus that includes a support plate supporting battery pack components and formed by a heat sink which thermally contacts the bottom surfaces of the battery pack components, and partition walls coupled to the bottom of the heat sink to define cooling spaces therebetween where a cooling air flows, and discharges heat from the battery pack components toward the cooling air via the heat sink.

SUMMARY OF THE INVENTION

According to one aspect of the present invention, a power supply apparatus for a vehicle includes a plurality of battery modules, a support plate, a plurality of first reinforcing projections, and a plurality of second reinforcing projections. The plurality of battery modules each includes a plurality of battery cells. The support plate supports the battery modules and includes a first plate and a second plate. The first plate thermally contacts bottom surfaces of the battery modules. The second plate is placed on a bottom surface of the first plate to define cooling spaces between the first and second plates. A coolant is to flow in the cooling spaces. The plurality of first reinforcing projections is provided on at least one of the first and second plates. The first reinforcing projections project into the cooling spaces and extend in a first direction. The plurality of second reinforcing projections is provided on a top surface of the first plate and extending in a second direction intersecting with the first direction.

According to another aspect of the present invention, a power supply apparatus for a vehicle includes a plurality of battery modules, a support plate, a battery cover, a plurality of first reinforcing projections, and a plurality of third reinforcing projections. The plurality of battery modules each includes a plurality of battery cells. The support plate supports the battery modules and includes a first plate and a second plate. The first plate thermally contacts bottom surfaces of the battery modules. The second plate is placed on a bottom surface of the first plate to define cooling spaces between the first and second plates. A coolant is to flow in the cooling spaces. The battery cover is coupled to the support plate to define an accommodation space to accommodate the battery modules. The plurality of first reinforcing projections is provided on at least one of the first and second plates. The first reinforcing projections project into the cooling spaces and extend in a first direction. The plurality of third reinforcing projections is provided on an inner side of the battery cover and extends at least in a second direction intersecting with the first direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
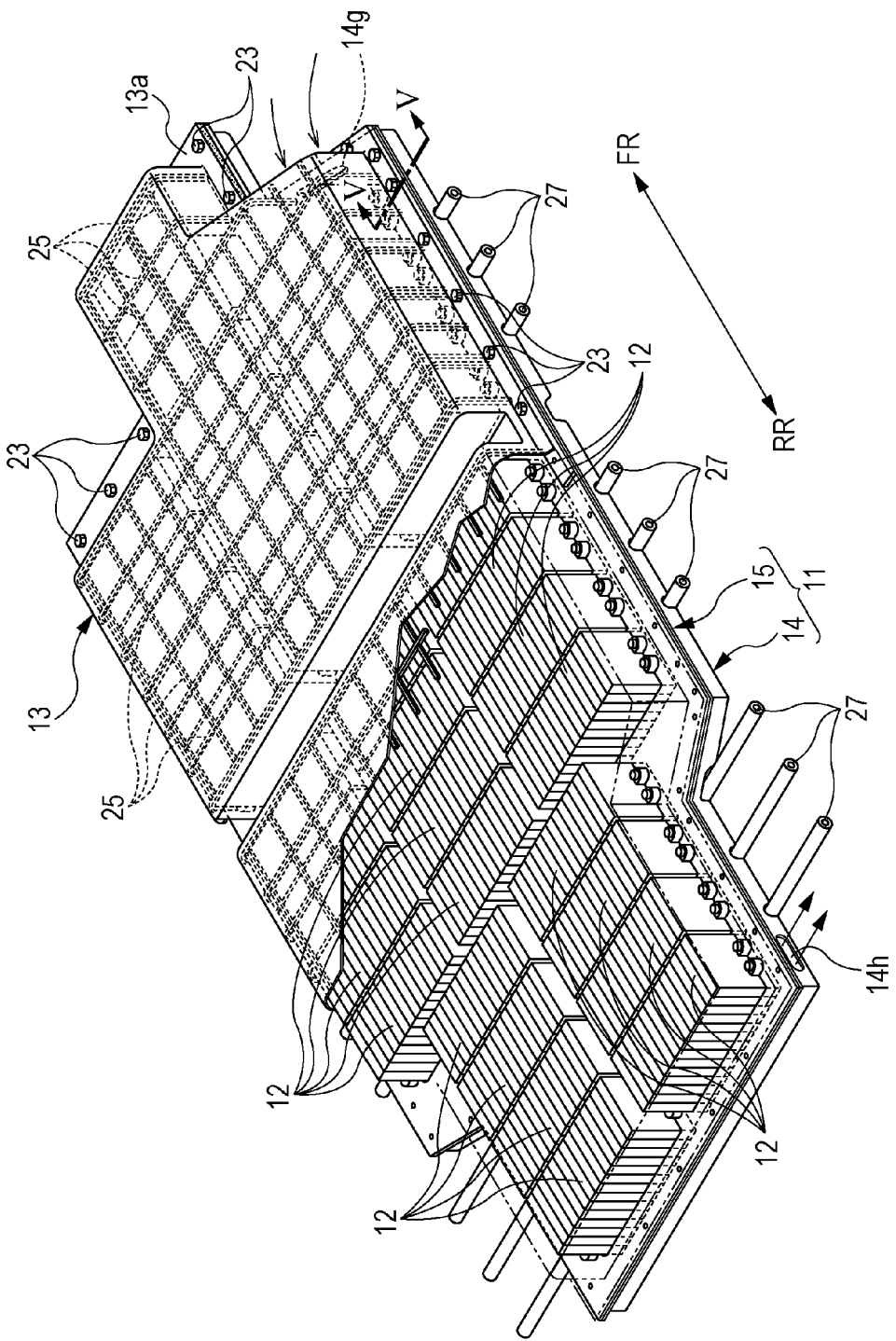
FIG. 1 is a perspective view of a power supply apparatus for a vehicle (first embodiment).
Figure 2:
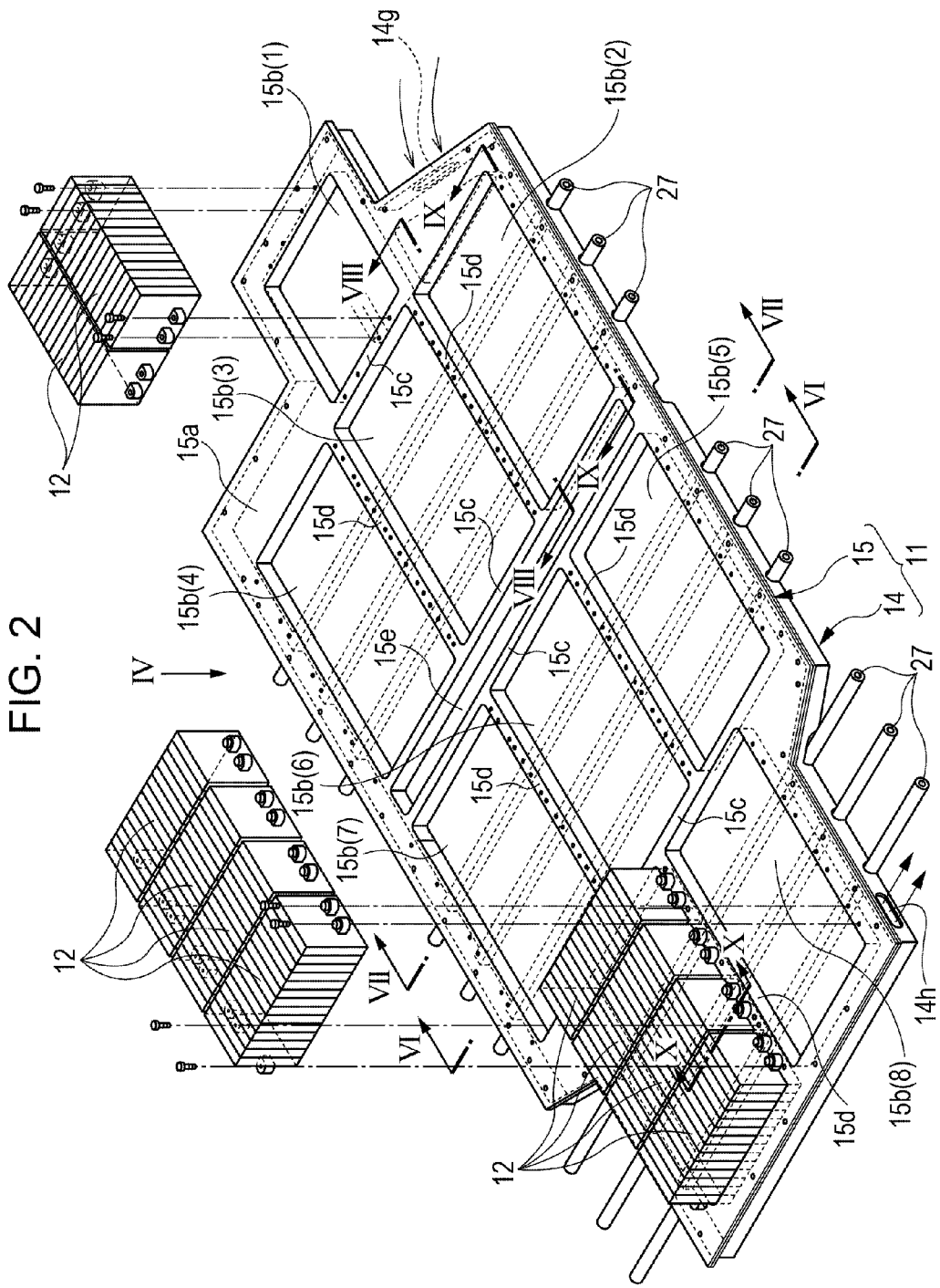
FIG. 2 is a diagram of the power supply apparatus with a battery cover and some battery modules removed therefrom (first embodiment).

The embodiments will now be described with reference to the accompanying drawings, wherein like reference numerals designate corresponding or identical elements throughout the various drawings.

A first embodiment of the disclosure will be described below with reference to FIGS. 1 to 10.

As shown in FIG. 1, a vehicular power supply apparatus that supplies power to a motor generator or a drive source for an electric vehicle has a plurality of battery modules 12 (34 battery modules in the embodiment) mounted on the top surface of a support plate 11 which is mounted on a vehicle body, and a battery cover 13 covering above the battery modules 12.

Figure 3:
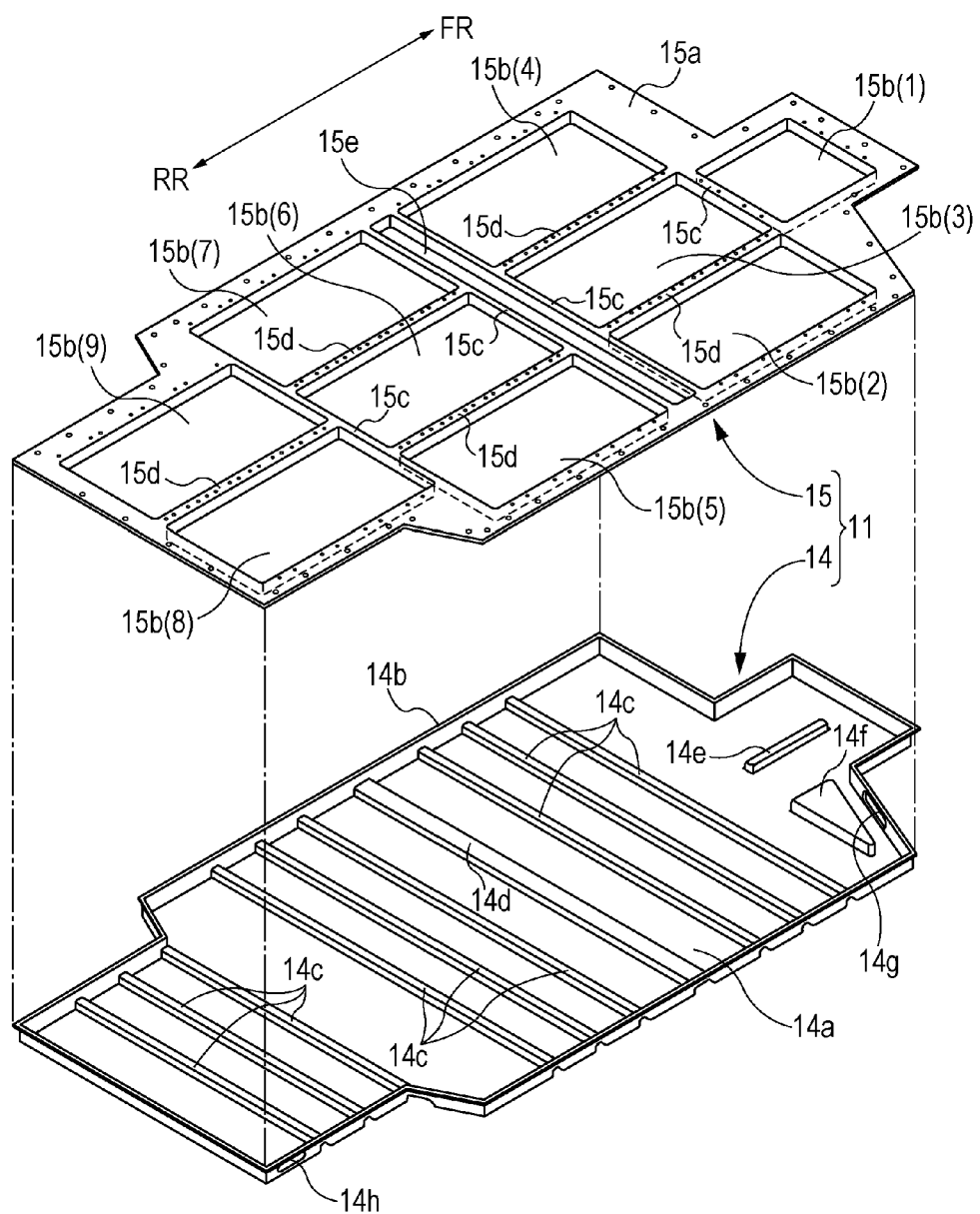
FIG. 3 is an exploded perspective view of a lower plate and an upper plate (first embodiment).

As shown in FIG. 3, the support plate 11 formed thin and elongated in the front-to-rear direction of the vehicle body includes a lower plate 14 and an upper plate 15 coupled together by spot-welding their peripheries. The lower plate 14 is formed by pressing an aluminum plate. The upper plate 15 is also formed by pressing an aluminum plate.

The lower plate 14 is a shallow pan-like member having a flat body 14a and a flange portion 14b formed by bending the peripheral portion of the body 14a upward and outward. The lower plate 14 is spot-welded to the peripheral portion of the upper plate 15 at the flange portion 14b. Nine first horizontal ribs 14c having a cross section of an inverted U shape and linearly extending in a widthwise direction of the vehicle (across the vehicle) are provided projecting upward on the body 14a of the lower plate 14. Both ends of the first horizontal ribs 14c are connected to the flange portion 14b. One second horizontal rib 14d having a cross section of an inverted U shape wider than the cross section of each of the third and fourth ones of the first horizontal ribs 14c from the front and linearly extending in the widthwise direction of the vehicle are provided projecting upward between those two first horizontal ribs 14c, 14c. Both ends of the second horizontal rib 14d are connected to the flange portion 14b.

One vertical rib 14e having a cross section of an inverted U shape and linearly extending in the front-to-rear direction is provided projecting upward on the front portion of the body 14a. A diversion rib 14f having a right-angled triangular shape is provided projecting upward on the body 14a to the right of the vertical rib 14e. The vertical rib 14e and the diversion rib 14f are not connected to any one of the flange portion 14b, the first horizontal ribs 14c and the second horizontal rib 14d, and are independent therefrom.

A cooling-air inlet opening 14g facing a hypotenuse of the diversion rib 14f is formed in a front right portion of the flange portion 14b. A cooling-air outlet opening 14h is formed in a rear right portion of the flange portion 14b rearward of the rearmost first horizontal rib 14c. The top surfaces of the first horizontal ribs 14c, the second horizontal rib 14d and the vertical rib 14e are higher than the flange portion 14b, and the top surface of the diversion rib 14f is higher than the top surfaces of the first horizontal ribs 14c, the second horizontal rib 14d and the vertical rib 14e, and is substantially flush with the flange portion 14b.

The upper plate 15 is likewise a shallow pan-like member having a flat body 15a formed along the periphery thereof, and first to ninth support portions 15b(1) to 15b(9) defined inside the body 15a. The first to ninth support portions 15b(1) to 15b(9) are shorter than the body 15a. Four horizontal ribs 15c and five vertical ribs 15d each having a cross section of an inverted U shape are provided between the adjoining first to ninth support portions 15b(1) to 15b(9). The top surfaces of the horizontal ribs 15c and the vertical ribs 15d are substantially flush with the body 15a. An elongated recess 15e having the same depth as those of the first to ninth support portions 15b(1) to 15b(9) and extending a cross section of an inverted U shape wider than the cross section of each of the third and fourth ones of the first horizontal ribs 14c from the front and linearly extending in the widthwise direction of the vehicle is formed between the second and third horizontal ribs 15c, 15c from the front.

Figure 4:
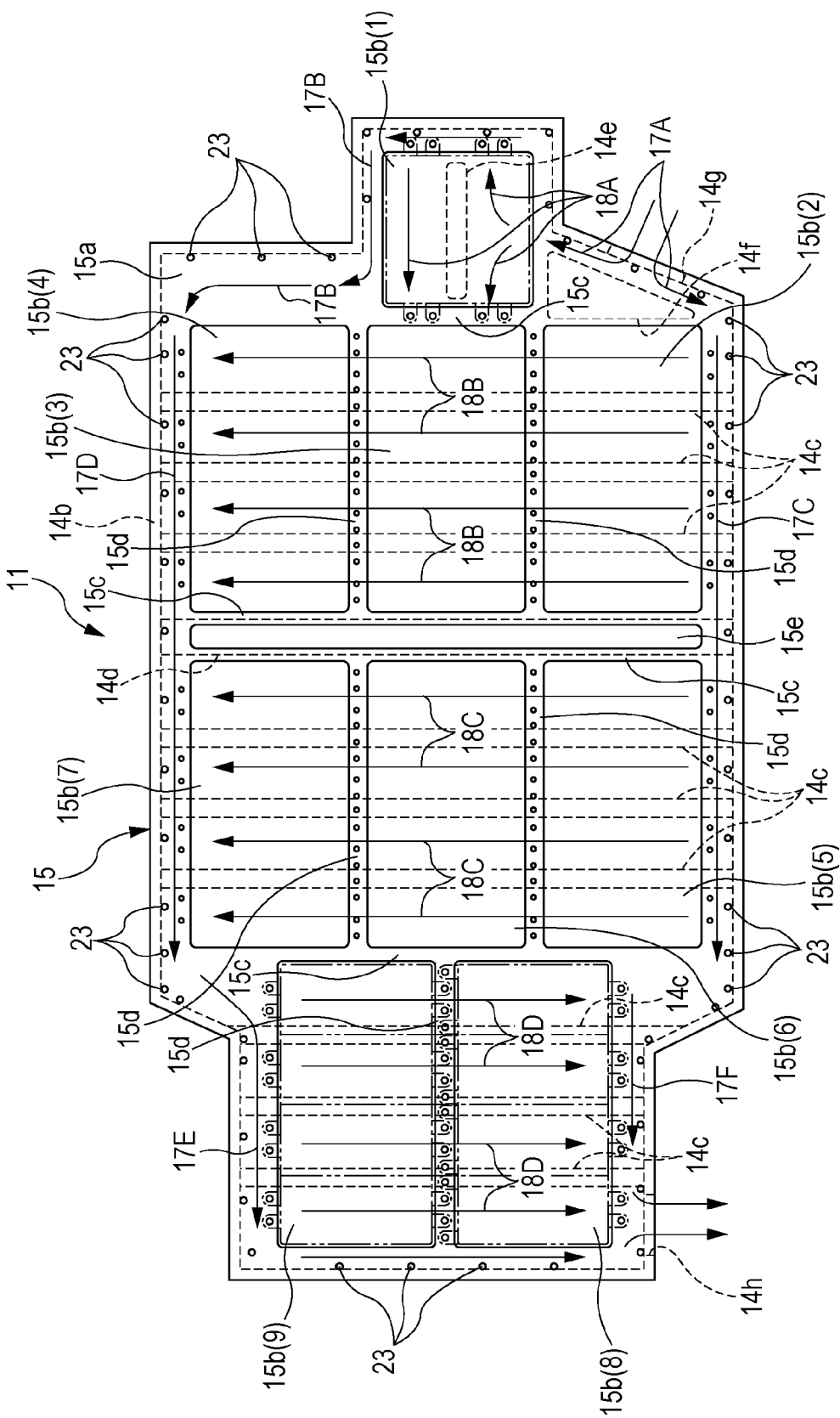
FIG. 4 is a diagram as seen from an arrow IV in FIG. 2 (first embodiment).
Figure 8:
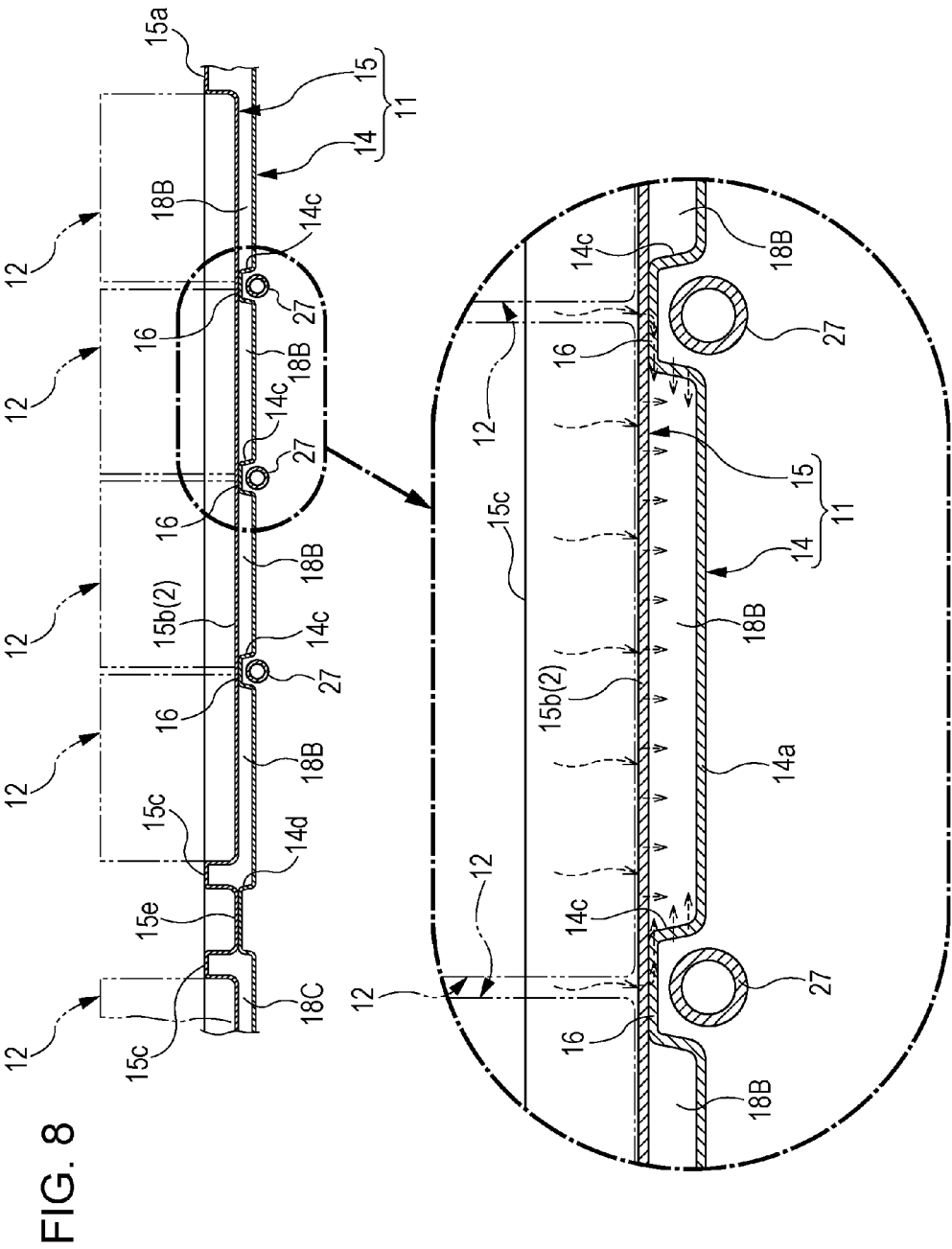
FIG. 8 is a cross-sectional view along line VIII-VIII in FIG. 2 (first embodiment).
Figure 9:
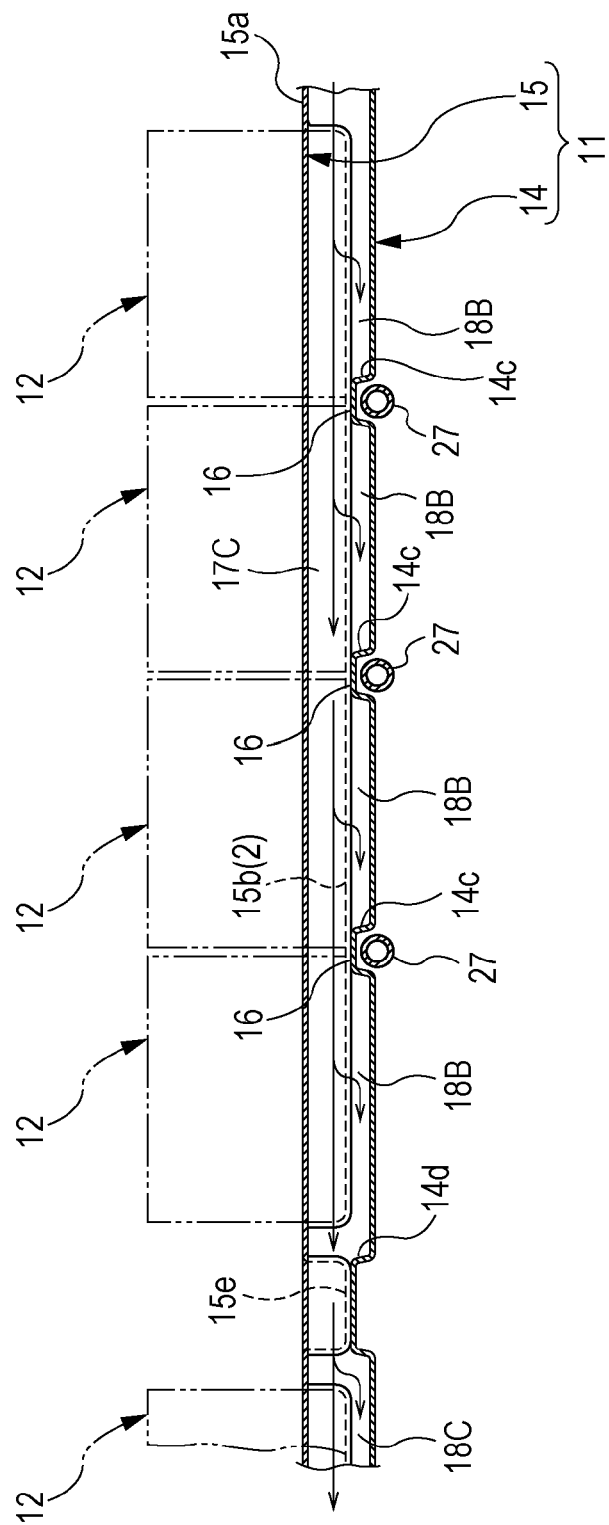
FIG. 9 is a cross-sectional view along line IX-IX in FIG. 2 (first embodiment).

As shown in FIG. 4, with the upper plate 15 placed on the top surface of the lower plate 14 and spot-welded, the top surfaces of the first horizontal ribs 14c and vertical rib 14e of the lower plate 14 abut on the bottom surfaces of the first to ninth support portions 15b(1) to 15b(9) of the upper plate 15 (see FIG. 7), the second horizontal rib 14d of the lower plate 14 abuts on the recess 15e of the upper plate 15 (see FIGS. 8 and 9). As a result, first to sixth cooling-air passages 17A to 17F having a height H1 (see FIG. 5) are formed between the plate body 14a of the lower plate 14 and the body 15a of the upper plate 15, and first to fourth cooling spaces 18A to 18D having a height H2 less than the height H1 (see FIGS. 5 and 10) are formed between the plate body 14a of the lower plate 14 and the first to ninth support portions 15b(1) to 15b(9) of the upper plate 15. The first to sixth cooling-air passages 17A to 17F and the first to fourth cooling spaces 18A to 18D are indicated in FIG. 4 by the respective reference numerals with arrows indicating the directions along which cooling air flows.

Figure 5:
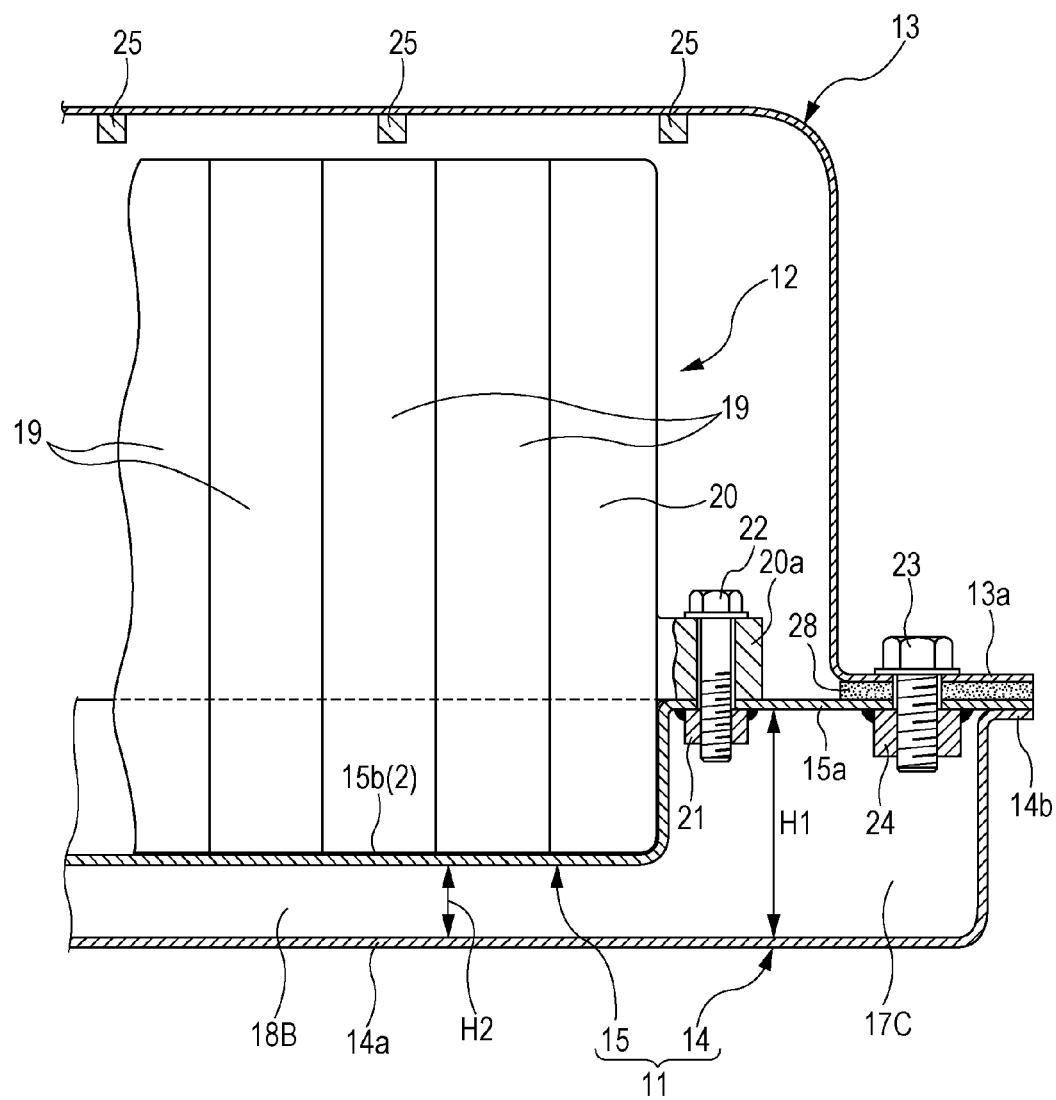
FIG. 5 is a cross-sectional view along line V-V in FIG. 1 (first embodiment).
Figure 6:
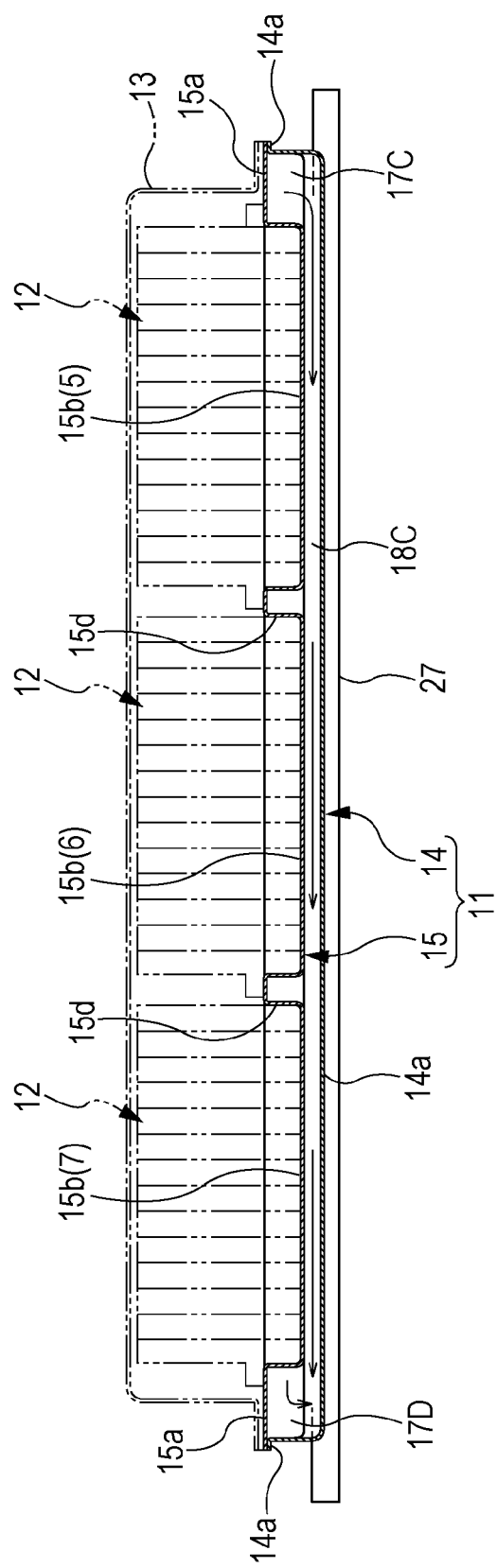
FIG. 6 is a cross-sectional view along line VI-VI in FIG. 2 (first embodiment).
Figure 7:
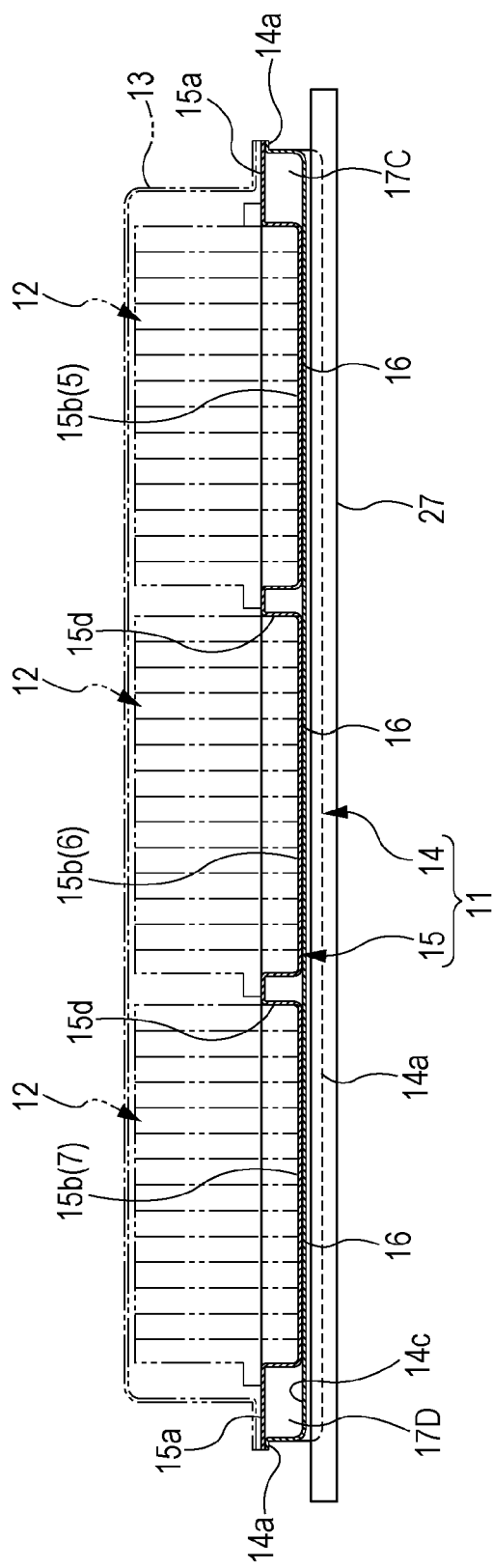
FIG. 7 is a cross-sectional view along line VII-VII in FIG. 2 (first embodiment).
Figure 10:
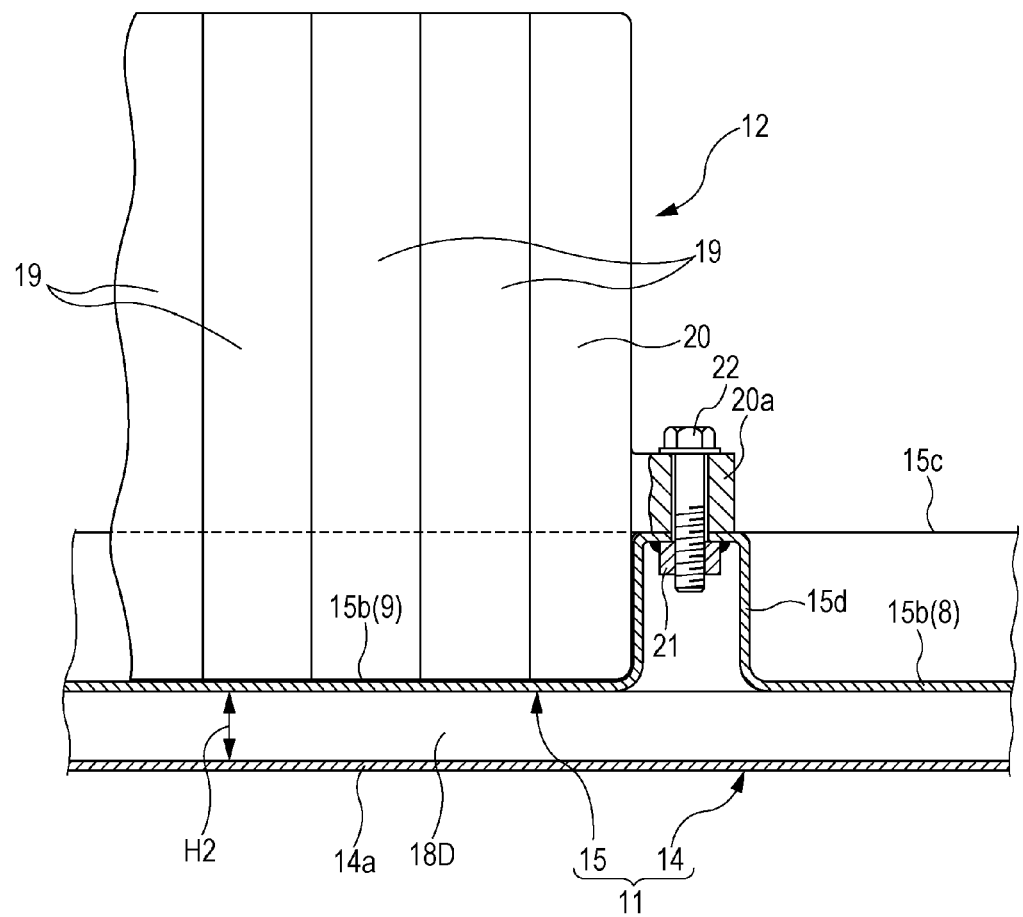
FIG. 10 is a cross-sectional view along line X-X in FIG. 2 (first embodiment).

As shown in FIGS. 1, 5 and 10, each battery module 12 has a stack of battery cells 19 integrally fastened by holding both ends of the stack in the stacking direction with a pair of end plates 20, 20. Each end plate 20 has two securing flanges 20a, 20a protrusively provided. Weld nuts 21 are provided in the bottom surfaces of the horizontal ribs 15c and the vertical ribs 15d of the upper plate 15, and those portions of the bottom surface of the body 15a which face the first to ninth support portions 15b(1) to 15b(9). The battery modules 12 are secured to the support plate 11 by screwing bolts 22, which are put through the securing flanges 20a of the battery modules 12, into the weld nuts 21. In this state, the bottom surfaces of the battery modules 12 abut on the top surfaces of the first to ninth support portions 15b(1) to 15b(9) of the upper plate 15 in a heat exchangeable manner.

The securing of the battery modules 12 using the horizontal ribs 15c and vertical ribs 15d of the upper plate 15 eliminates the need for special members for securing the battery modules 12. This can achieve the simplification of the configuration.

As shown in FIGS. 1 and 5, the battery cover 13 is a press-molded aluminum plate, and has a flange portion 13a formed at the periphery thereof. The flange portion 13a is placed on the peripheral portion of the body 15a of the upper plate 15 of the support plate 11 via a seal member 28, and secured thereto with a plurality of bolts 23 and a plurality of weld nuts 24. To enhance the rigidity of the battery cover 13, reinforcing ribs 25 of a metal are secured to the inner surface of the battery cover 13 vertically and horizontally by welding or the like.

As shown in FIGS. 1 and 8, with the vehicular power supply apparatus mounted in the vehicle, nine cross members 27 formed by pipe members which connect a pair of side frames (not shown), extending in the front-to-rear direction on both right and left sides of the vehicle body, in the widthwise direction of the vehicle are fitted in spaces formed under the first horizontal ribs 14c of the lower plate 14 with a clearance therein. As a result, the cross members 27 become a positioning guide when the vehicular power supply apparatus is mounted in the vehicle body as well as permit the position of the support plate 11 to be lowered while avoiding the interferences of the cross members 27 with the lower plate 14. This can reduce the vertical space for mounting the vehicular power supply apparatus in the vehicle body.

Next, the action of the first embodiment with the foregoing configuration will be described.

Referring to FIGS. 3 and 4, when air is sucked through the cooling-air outlet opening 14h of the support plate 11 of the vehicular power supply apparatus with a cooling fun unit (not shown), cooling air flows into the first cooling-air passage 17A formed between the lower plate 14 and the upper plate 15 through the cooling-air inlet opening 14g of the support plate 11. The cooling air which has flowed into the first cooling-air passage 17A hits the diversion rib 14f to be diverted toward the second cooling-air passage 17B and the third cooling-air passage 17C.

The cooling air diverted toward the second cooling-air passage 17B flows through the first cooling space 18A formed in the bottom surface of the first support portion 15b(1) of the upper plate 15 on its way, and then flows to the front end of the fourth cooling-air passage 17D through the second cooling-air passage 17B. The cooling air diverted toward the third cooling-air passage 17C changes its direction by 90° while it is flowing rearward in the third cooling-air passage 17C, flows through the second cooling space 18B (see FIGS. 8 and 9) and the third cooling space 18C (see FIG. 6), formed in the bottom surfaces of the second to fourth support portions 15b(2) to 15b(4) of the upper plate 15 and the bottom surfaces of the bottom surfaces of the fifth to seventh support portions 15b(5) to 15b(7) thereof, in the widthwise direction of the vehicle, and is then merged with the diverted cooling air flowing through the fourth cooling-air passage 17D extending in the front-to-rear direction. The merged cooling air changes its direction by 90° to flow rearward.

The cooling air which has flowed to the front end of the fifth cooling-air passage 17E from the rear end of the fourth cooling-air passage 17D changes its direction by 90° while it is flowing rearward in the fifth cooling-air passage 17E, flows through the fourth cooling space 18D, formed in the bottom surfaces of the eighth and ninth support portions 15b(8) and 15b(9), in the widthwise direction of the vehicle, and is then merged with the cooling air flowing through the sixth cooling-air passage 17F extending in the front-to-rear direction. The merged cooling air changes its direction by 90° to flow rearward, and is discharged from the cooling-air outlet opening 14h.

The first cooling space 18A is separated into two spaces by the vertical rib 14e extending in the front-to-rear direction, and the vertical rib 14e is arranged between two battery modules 12, 12 mounted on the first support portion 15b(1) above the first cooling space 18A. When the cooling air flows through the first cooling space 18A, therefore, the cooling air in the first cooling space 18A can flow uniformly and smoothly along the bottom surfaces of the two battery modules 12, 12, thus enhancing the cooling effect.

The second and third cooling spaces 18B, 18C are separated into eight spaces by six first horizontal ribs 14c and one second horizontal rib 14d, which extend in the widthwise direction of the vehicle, and the first horizontal ribs 14c and the second horizontal rib 14d are arranged between twenty-four battery modules 12 mounted on the second to seventh support portions 15b(2) to 15b(7) above the second and third cooling spaces 18B, 18C. When the cooling air flows through the second and third cooling spaces 18B, 18C, therefore, the cooling air in the second and third cooling spaces 18B, 18C can flow uniformly and smoothly along the bottom surfaces of the twenty-four battery modules 12, thus enhancing the cooling effect.

Likewise, the fourth cooling space 18D is separated into four spaces by three first horizontal ribs 14c extending in the widthwise direction of the vehicle, and the first horizontal ribs 14c are arranged between eight battery modules 12 mounted on the eight and ninth support portions 15b(8) and 15b(9) above the fourth cooling space 18D. When the cooling air flows through the fourth cooling space 18D, therefore, the cooling air in the fourth cooling space 18D can flow uniformly and smoothly along the bottom surfaces of the eight battery modules 12, thus enhancing the cooling effect.

When the cooling air flows through the first to fourth cooling spaces 18A to 18D defined under the upper plate 15 which supports the bottom surfaces of a plurality of battery modules 12, heat from the battery modules 12 is transmitted to the cooling air via the upper plate 15 and the lower plate 14 contacting the upper plate 15. This suppress a rise in the temperature of the battery cells 19 of the battery module 12, making it possible to prolong the service life of the battery module 12.

As shown in FIG. 8, the tops of the first horizontal ribs 14c, the second horizontal rib 14d and the vertical rib 14e of the lower plate 14 are in contact with the bottom surface of the upper plate 15 at contact portions 16, so that higher heat dissipation is achieved at the contact portions 16, making it possible to easily take heat from the battery modules 12. If the contact portions 16 face the bottom surfaces of the battery modules 12, therefore, those portions of the bottom surfaces of the battery modules 12 which face the contact portions 16 are cooled intensively, producing a temperature difference between the portions and those portions of the bottom surfaces of the battery modules 12 which do not face the contact portions 16. This may adversely affect the service life of the battery cells 19.

According to the embodiment, however, the contact portions 16 between the lower plate 14 and the upper plate 15 do not face the bottom surfaces of the battery modules 12, but face the space between two adjoining battery modules 12, 12, preventing the bottom surfaces of the battery modules 12 from being locally cooled, which would otherwise deteriorate the battery modules 12.

Further, a plurality of first horizontal ribs 14c and the second horizontal rib 14d, which extend in the flow direction of the cooling air, are formed on the lower plate 14, and a plurality of vertical ribs 15d extending in a direction crossing the flow direction of the cooling air are formed on the top surface of the upper plate 15, rigidity against bending of the support plate 11 in two directions can be secured by the first and second horizontal ribs 14c, 14d, and the vertical ribs 15d. In addition, the first and second horizontal ribs 14c, 14d of the lower plate 14 which project into the second to fourth cooling spaces 18B to 18D extend in the flow direction of the cooling air, and the vertical ribs 15d of the upper plate 15 project out of the cooling spaces, so that the first and second horizontal ribs 14c and 14d, and the vertical rib 15d do not interfere with the flow of the cooling air. This makes it possible to secure the cooling performance.

Further, the vehicular power supply apparatus includes the battery cover 13 which is coupled to the support plate 11 to define an accommodation space to accommodate the battery modules 12. It is therefore possible to protect the battery modules 12 from a damage or the like caused by dust, water or collision with another object, as well as to allow the support plate 11 and the battery cover 13 to reinforce each other, thereby improving the rigidity of the entire vehicular power supply apparatus.

Particularly, the reinforcing ribs 25 of the battery cover 13 extend in a grid pattern in a direction parallel to the flow direction of the cooling air in the second to fourth cooling spaces 18B to 18D and in a direction crossing the flow direction of the cooling air therein. Therefore, the first and second horizontal ribs 14c and 14d of the lower plate 14 which extend in the flow direction of the cooling air can enhance the rigidity of the support plate 11 against bending thereof in one direction, and can enhance the rigidity of the support plate 11 against bending thereof in the other direction.

The first and second horizontal ribs 14c and 14d projecting into the second to fourth cooling spaces 18B to 18D extend in the flow direction of the cooling air, and the reinforcing ribs 25 project out of the second to fourth cooling spaces 18B to 18D, so that the first and second horizontal ribs 14c, 14d and the reinforcing ribs 25 do not interfere with the flow of the cooling air, thus making it possible to secure the cooling performance. What is more, the provision of the reinforcing ribs 25 on the battery cover 13 permits the top surface of the support plate 11 to be used effectively, thus facilitating the mounting of the battery modules 12.

Figure 11:
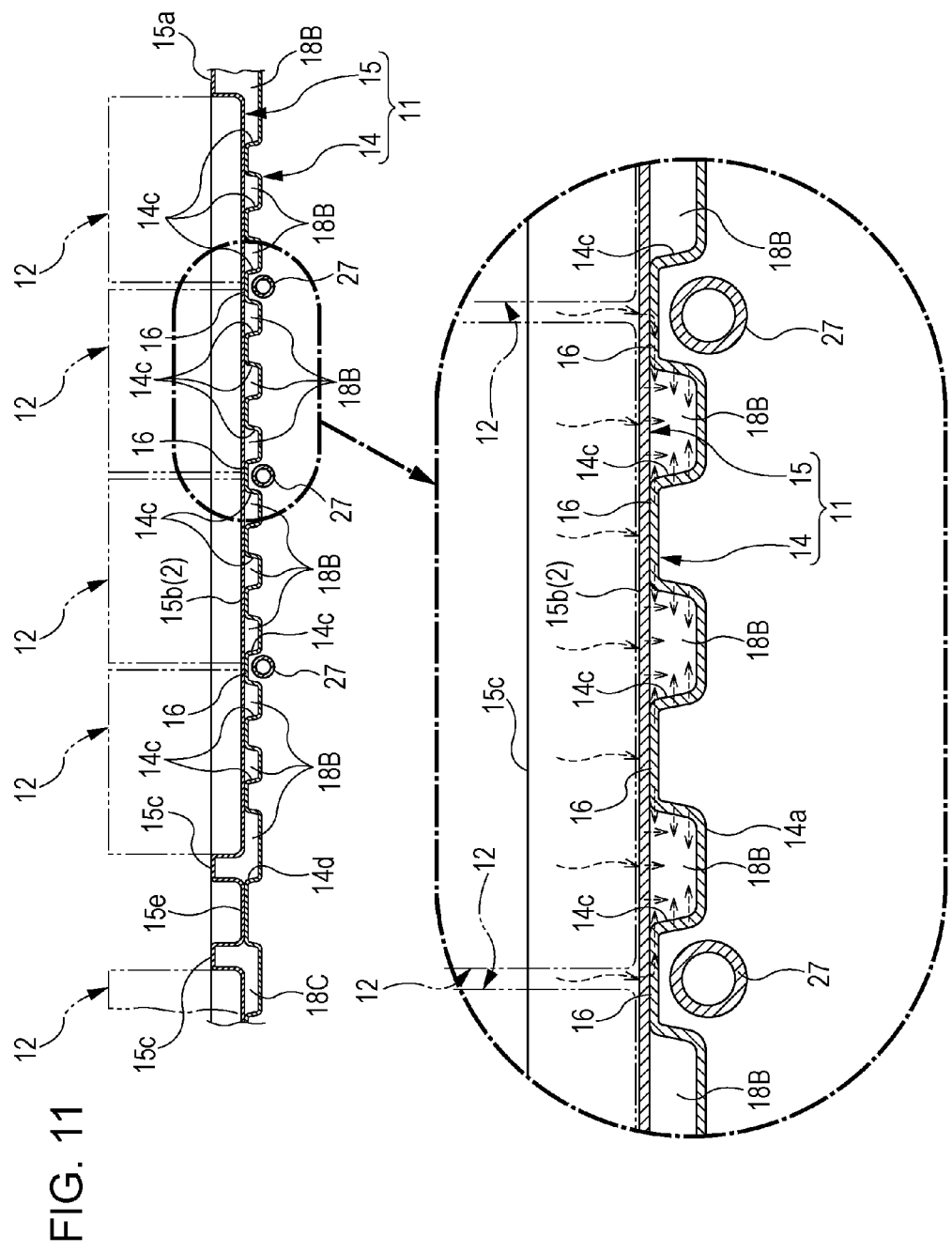
FIG. 11 is a cross-sectional view corresponding to FIG. 8 (second embodiment).

A second embodiment of the disclosure will be described below with reference to FIG. 11.

Although the first horizontal ribs 14c of the lower plate 14 are provided in correspondence to the positions of the individual cross members 27 in the first embodiment shown in FIG. 8, two first horizontal ribs 14c, 14c are further added between each pair of adjoining cross members 27, 27 according to the second embodiment.

The increase in the number of the first horizontal ribs 14c this way causes the lower plate 14 and the upper plate 15 to contact each other at more contact portions 16, so that higher heat dissipation is achieved, improving the cooling performance of the battery modules 12.

According to the first embodiment, as described above, if the contact portion 16 is positioned in the center portion of the bottom surface of the battery module 12, the battery module 12 is cooled locally, resulting in non-uniform temperature distribution and thus shortening the service life of the battery cells 19. When a plurality of contact portions 16 are positioned on the bottom surface of each battery module 12 as done according to the second embodiment, it is possible to overcome non-uniform temperature distribution, thus suppressing the service life of the battery cells 19 from becoming shorter.

Figure 12:
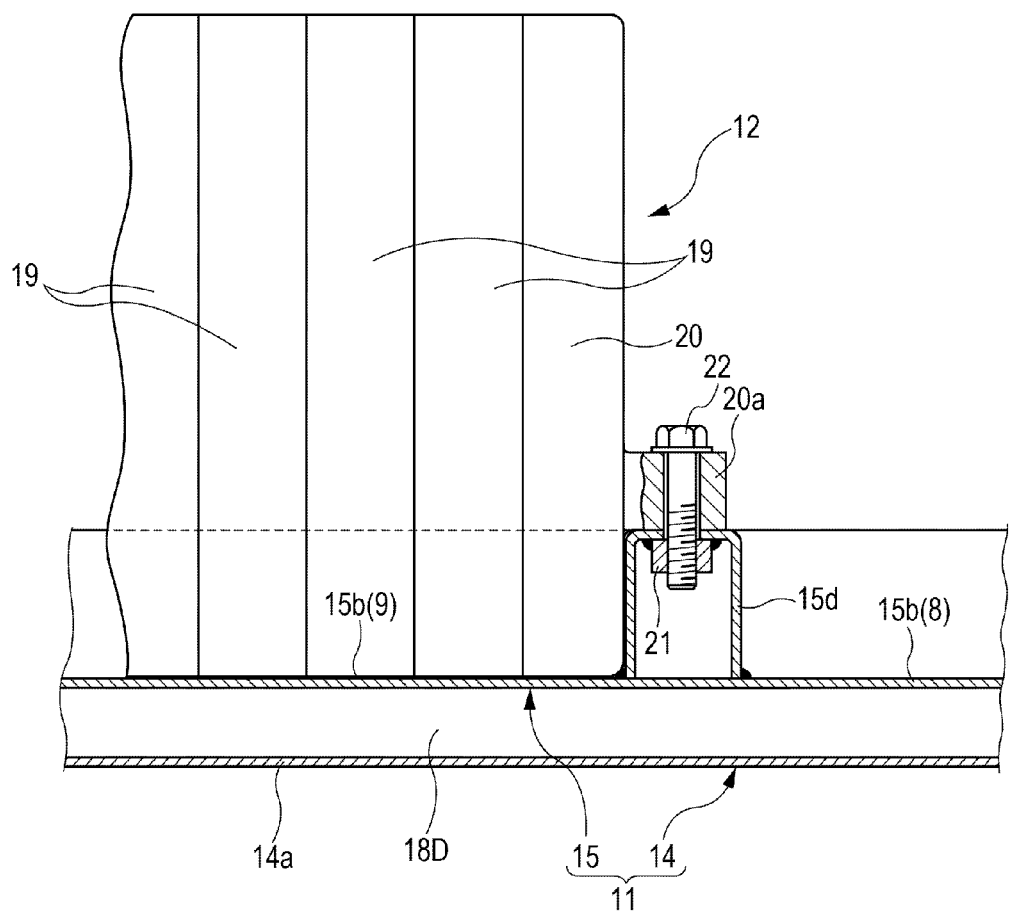
FIG. 12 is a cross-sectional view corresponding to FIG. 10 (third embodiment).

A third embodiment of the disclosure will be described below with reference to FIG. 12.

Although the vertical ribs 15d of the upper plate 15 and the body 15a are press-molded integrally according to the first embodiment, the vertical ribs 15d are formed by separate members and are welded to the flat body 15a according to the third embodiment. This flattens the second to fourth cooling spaces 18B to 18D to reduce resistance to cooling air, so that the cooling air flows smoothly, resulting in an improved cooling efficiency of the battery cells 19.

Although the embodiments of the disclosure have been described heretofore, various design modifications of the subject matter of the disclosure may be made without departing from the scope and spirit of the disclosure.

For example, although the first and second horizontal ribs 14c, 14d projecting into the second to fourth cooling spaces 18B to 18D and extending in the flow direction of the cooling air are formed on the lower plate 14 according to the foregoing embodiments, the first and second horizontal ribs 14c, 14d may be formed on the upper plate 15.

Although the first and second horizontal ribs 14c, 14d and the vertical rib 14e of the lower plate 14 are integrally press-molded together with the body 14a of the lower plate 14 according to the first embodiment, the first and second horizontal ribs 14c, 14d and the vertical rib 14e may be formed by separate members and be welded to the flat body 14a. The cross-sectional shapes of the first and second horizontal ribs 14c, 14d and the vertical rib 14e are not limited to the illustrated inverted U shape, and may be closed cross sections, such as rectangular shapes. This can provide effects similar to those of the first embodiment.

According to one aspect of an exemplary embodiment of the disclosure, there is proposed a power supply apparatus for a vehicle, including a plurality of battery modules each assembled by a plurality of battery cells, a support plate supporting the battery modules, and including a first plate which thermally contacts bottom surfaces of the battery modules, and a second plate placed on a bottom surface of the first plate to define cooling spaces therebetween where a coolant flows. The power supply apparatus further includes a plurality of first reinforcing projections formed on at least one of the first and second plates, projecting into the cooling spaces, and extending in a flow direction of the coolant, and a plurality of second reinforcing projections formed on a top surface of the first plate, and extending in a direction crossing the flow direction of the coolant.

With the configuration of the first aspect, rigidity against bending of the support plate in two directions can be secured by the first reinforcing projections and the second reinforcing projections. In addition, because the first reinforcing projections projecting into the cooling spaces extend in the flow direction of the coolant, and the second reinforcing projections project out of the cooling spaces, the first and second reinforcing projections do not interfere with the flow of the coolant, thereby securing the cooling performance.

In addition to the above configuration, the first reinforcing projections may contact the other one of the first and second plates at contact portions, and edges of the bottom surfaces of the battery modules may be laid out along the contact portions.

This configuration makes it easier for the heat of the first plate to escape to the second plate, improving heat dissipation in the vicinity of the contact portions of the first plate. If the intermediate portion of the bottom surface of the battery module is located above the contact portion, the battery module is locally cooled, producing a temperature difference between individual battery cells. This temperature difference may shorten the service life of the battery module. However, the layout of the edges of the bottom surface of the battery module along the contact portion makes it difficult to locally cool the battery module, thereby minimizing the temperature difference between individual battery cells.

In addition to the configuration of the first aspect, the first reinforcing projections may be formed by bending the second plate toward the first plate in a groove form, and a vehicle body frame may be placed in cooling spaces formed under the first reinforcing projections when the support plate is mounted on a body of the vehicle.

Forming the first reinforcing projections by bending the second plate toward the first plate in a groove form forms spaces under the first reinforcing projections. When the support plate is mounted on the body of a vehicle, the vehicle body frame is placed in the spaces formed under the first reinforcing projections, which provides a positioning guide when the vehicular power supply apparatus is mounted in the vehicle body as well as permits the position of the support plate to be lowered while avoiding the interferences of the vehicle body frame with the first plate. This can reduce the vertical space for mounting the vehicular power supply apparatus in the vehicle body.

In addition to the configuration of the first aspect, the battery modules may be secured to the second reinforcing projections.

Securing the battery modules to the second reinforcing projections eliminates the need for special members for securing the battery modules. This simplifies the configuration.

In addition to the configuration of the first aspect, the power supply apparatus may further include a battery cover coupled to the support plate to define an accommodation space to accommodate the battery modules, and a plurality of third reinforcing projections provided on a side of the battery cover where the accommodation space lies.

Because the battery cover is coupled to the support plate, the support plate and the battery cover reinforce each other, thereby improving the rigidity of the entire vehicular power supply apparatus.

According to another aspect of the exemplary embodiment of the disclosure, there is proposed a power supply apparatus for a vehicle, including a plurality of battery modules each assembled by a plurality of battery cells, a support plate supporting the battery modules, and including a first plate which thermally contacts bottom surfaces of the battery modules, and a second plate placed on a bottom surface of the first plate to define cooling spaces therebetween where a coolant flows, and a battery cover coupled to the support plate to define an accommodation space to accommodate the battery modules. The power supply apparatus further includes a plurality of first reinforcing projections formed on at least one of the first and second plates, projecting into the cooling spaces, and extending in a flow direction of the coolant, and a plurality of third reinforcing projections provided on a side of the battery cover where the accommodation space lies, and extending at least in a direction crossing the flow direction of the coolant.

With the configuration of the second aspect, rigidity against bending of the support plate in two directions can be secured by the first reinforcing projections and the second reinforcing projections. In addition, because the first reinforcing projections projecting into the cooling spaces extend in the flow direction of the coolant, and the third reinforcing projections project out of the cooling spaces, the first and third reinforcing projections do not interfere with the flow of the coolant, thereby securing the cooling performance. Further, the provision of the third reinforcing projections on the battery cover ensures effective use of the top surface of the support plate, thus facilitating the mounting of the battery modules.

A lower plate 14 according to an exemplary embodiment corresponds to the second plate, first and second horizontal ribs 14c, 14d according to the exemplary embodiment correspond to the first reinforcing projections, an upper plate 15 according to the exemplary embodiment corresponds to the first plate, vertical ribs 15d according to the exemplary embodiment correspond to the second reinforcing projections, second to fourth cooling spaces 18B to 18D according to the exemplary embodiment correspond to the cooling spaces, and reinforcing ribs 25 according to the exemplary embodiment correspond to the third reinforcing projections.

Obviously, numerous modifications and variations of the present invention are possible in light of the above teachings. It is therefore to be understood that within the scope of the appended claims, the invention may be practiced otherwise than as specifically described herein.

What is claimed is:

1. A power supply apparatus for a vehicle, comprising:
a plurality of battery modules each including a plurality of battery cells;
a support plate supporting the battery modules and including a first plate and a second plate, the first plate thermally contacting bottom surfaces of the battery modules, the second plate being placed on a bottom surface of the first plate to define cooling spaces in which a coolant is to flow, the cooling spaces being defined between the first and second plates under the battery modules and extending in a first direction along the bottom surface of the first plate;
a plurality of first reinforcing projections provided on at least one of the first and second plates, the first reinforcing projections projecting into the cooling spaces and extending in the first direction along the cooling spaces; and
a plurality of second reinforcing projections provided on a top surface of the first plate and extending in a second direction intersecting with the first direction, the second reinforcing projections being provided between the battery modules in the first direction.

2. The power supply apparatus according to claim 1, wherein the first reinforcing projections includes contact portions contacting one of the first and second plates, and
wherein edges of the bottom surfaces of the battery modules are provided along the contact portions.

3. The power supply apparatus according to claim 2, wherein the contact portions extend in the first direction.

4. The power supply apparatus according to claim 1, wherein the first reinforcing projections are provided by bending the second plate toward the first plate in a groove form, and
wherein a vehicle body frame is placed in at least one of grooves provided under the first reinforcing projections when the support plate is mounted on a body of the vehicle.

5. The power supply apparatus according to claim 1, wherein the battery modules are secured to the second reinforcing projections.

6. A power supply apparatus comprising:
a plurality of battery modules each including a plurality of battery cells;
a support plate supporting the battery modules and including a first plate and a second plate, the first plate thermally contacting bottom surfaces of the battery modules, the second plate being placed on a bottom surface of the first plate to define cooling spaces between the first and second plates, a coolant being to flow in the cooling spaces;
a plurality of first reinforcing projections provided on at least one of the first and second plates, the first reinforcing projections projecting into the cooling spaces and extending in a first direction;
a plurality of second reinforcing projections provided on a top surface of the first plate and extending in a second direction intersecting with the first direction;
a battery cover coupled to the support plate to define an accommodation space to accommodate the battery modules; and
a plurality of third reinforcing projections provided on an inner side of the battery cover.

7. The power supply apparatus according to claim 6, wherein the third reinforcing projections extend at least in the first direction.

8. The power supply apparatus according to claim 1, wherein the first direction is perpendicular to the second direction.

9. A power supply apparatus for a vehicle, comprising:
a plurality of battery modules each including a plurality of battery cells;
a support plate supporting the battery modules and including a first plate and a second plate, the first plate thermally contacting bottom surfaces of the battery modules, the second plate being placed on a bottom surface of the first plate to define cooling spaces between the first and second plates, a coolant being to flow in the cooling spaces;
a battery cover coupled to the support plate to define an accommodation space to accommodate the battery modules;
a plurality of first reinforcing projections provided on at least one of the first and second plates, the first reinforcing projections projecting into the cooling spaces and extending in a first direction; and
a plurality of third reinforcing projections provided on an inner side of the battery cover and extending at least in a second direction intersecting with the first direction.

10. The power supply apparatus according to claim 9, wherein the first reinforcing projections includes contact portions contacting one of the first and second plates, and
wherein edges of the bottom surfaces of the battery modules are provided along the contact portions.

11. The power supply apparatus according to claim 10, wherein the contact portions extend in the first direction.

12. The power supply apparatus according to claim 9, wherein the first reinforcing projections are provided by bending the second plate toward the first plate in a groove form, and wherein a vehicle body frame is placed in at least one of grooves provided under the first reinforcing projections when the support plate is mounted on a body of the vehicle.

13. The power supply apparatus according to claim 9, wherein the cooling spaces extend in the first direction.

14. The power supply apparatus according to claim 9, wherein the first direction is perpendicular to the second direction.

15. The power supply apparatus according to claim 5, further comprising:
securing members to secure the battery modules to the second reinforcing projections.

16. The power supply apparatus according to claim 15, wherein each of the battery modules includes a secured portion secured to the second reinforcing projections with the securing members.

17. The power supply apparatus according to claim 1,
wherein the battery modules are spaced apart from each other in the first direction to define spaces between side faces of the battery modules, and
wherein the second reinforcing projections are provided in the spaces extending in the second direction between the battery modules.

18. The power supply apparatus according to claim 1, wherein the first reinforcing projections are spaced apart from each other in the second direction.

19. The power supply apparatus according to claim 1, wherein the first reinforcing projections projects from the second plate toward the first plate and contacts the bottom surface of the first plate.

* * * * *